United States Patent [19]

Howlett

[11] 4,064,480
[45] Dec. 20, 1977

[54] MEANS AND METHOD FOR RECORDING SEISMIC SIGNALS

[75] Inventor: Donald L. Howlett, Houston, Tex.

[73] Assignee: Texaco Inc., New York, N.Y.

[21] Appl. No.: 630,241

[22] Filed: Nov. 10, 1975

[51] Int. Cl.² ............................. G01V 1/28; H03F 1/14
[52] U.S. Cl. ................................. 340/15.5 GC; 330/51; 340/15.5 DP
[58] Field of Search ............... 340/15.5 GC, 15.5 DP; 330/84, 86, 51, 124, 129; 328/151, 168

[56] References Cited

U.S. PATENT DOCUMENTS

| | | | |
|---|---|---|---|
| 3,264,574 | 8/1966 | Loofbourrow | 340/15.5 GC |
| 3,562,744 | 2/1971 | Howlett | 340/15.5 GC |
| 3,671,931 | 6/1972 | Loofbourrow | 330/51 |
| 3,675,194 | 7/1972 | Borkowsky et al. | 340/15.5 DP |
| 3,688,250 | 8/1972 | Howlett | 340/15.5 DP |
| 3,700,871 | 10/1972 | Montgomery et al. | 340/15.5 GC |
| 3,813,609 | 5/1974 | Wilkes et al. | 330/124 |
| 3,919,657 | 11/1975 | Howlett et al. | 330/51 |
| 3,969,683 | 7/1976 | Fabricius | 330/129 |

*Primary Examiner*—Nelson Moskowitz
*Attorney, Agent, or Firm*—Thomas H. Whaley; Carl G. Ries; Ronald G. Gillespie

[57] ABSTRACT

An amplifying channel provides amplified signals corresponding to a received wide dynamic range analog input signal such as provided by a geophone group. A plurality of level comparators which number one less than the number of amplified signals compare the amplified signals with reference signals corresponding to a predetermined range of a desired output signal. The comparators provide outputs corresponding to the comparison to logic circuitry which develop sampling signals. The amplified signals from the amplified channel are also provided to a plurality of switches which are controlled by sampling pulses provided by the logic circuitry to sample an amplified signal within the range defined by the reference signals and provide it as the analog output signal. The analog output signal is converted to digital signals which are provided with other digital signals corresponding to the gain relationship between the analog output signal and the received analog input signal.

14 Claims, 5 Drawing Figures

MEANS AND METHOD FOR RECORDING SEISMIC SIGNALS

BACKGROUND OF THE INVENTION

Field of the Invention

The present system and method relates to amplifying systems and methods in general and, more particularly, to a floating point amplifier system and method.

SUMMARY OF THE INVENTION

A seismic system includes an amplifying channel which receives a wide dynamic range input signal. The amplifying channel provides amplified signals having different amplitudes corresponding to the input signal. Comparators compare each amplified signal, except for the least amplitude amplified signal, with reference signals corresponding to a predetermined range for an output signal. The comparators provide a plurality of outputs in accordance with the comparisons. A logic circuit processes the comparison signals to provide sampling pulses. Switches receiving the amplified signals from the amplifying channel are controlled by the sampling pulses to sample the amplified signals to provide the analog output in accordance with the comparison signals. An analog-to-digital converter network receives the gain signal and the analog output and provides digital signals, some of which correspond to the gain signal while the remaining digital signals correspond to the plurality and magnitude of the analog output.

The objects and advantages of the invention will appear more fully hereinafter, from a consideration of the detailed description which follows, taken together with the accompanying drawings wherein several embodiments are illustrated by way of example. It is to be expressly understood, however, that the drawings are for illustrative purposes only and are not to be construed as defining the limits of the invention.

DESCRIPTION OF THE INVENTION

Figure 1:
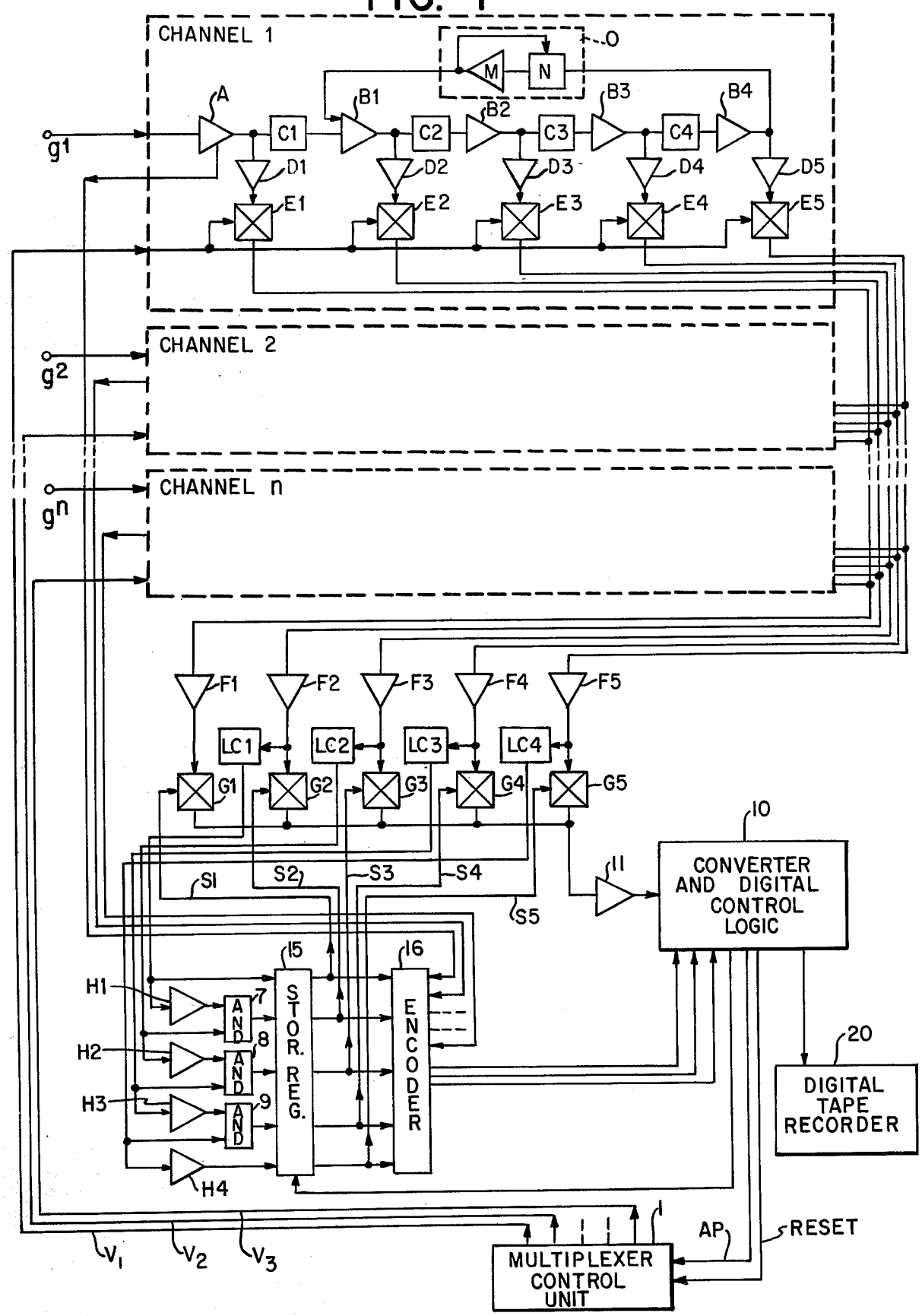
FIG. 1 is a simplified block diagram of a seismic recording system constructed in accordance with one embodiment of the present invention.

In FIG. 1 there is shown a seismic signal processing and recording system, including a plurality of geophones, G1, G2 $G_n$ indicating the presence of a plurality of such acoustic-to-electric transducer devices as determined by the particular practice in the art, for example 12 or 24 or some other number thereof. Each of these geophones may in actuality comprise a group or cluster or a plurality of individual geophone instruments, with the respective output couple together provide a common geophone signal.

In FIG. 1, the respective geophones $G_1$, $G_2$ and $G_n$ are shown coupled to the input portions of respective signal channels identified as channels 1, 2 and $n$ respectively. Channels 1 through $n$ are substantially identical, so that a description of Channel 1 is also applicable to any other channel. Three channels are shown in the illustrated embodiment; it is to be understood that Channel $n$ is represented by one or more of such channels and that, in most cases, seismic signal process systems of the type described, comprise 12, 24 or larger number of channels.

Channel 1 comprises a plurality of amplifier stages, A and $B_1$ through $B_4$ directly coupled, e.g. DC coupled, to one another in cascade circuit relationship, with coupling networks $C_1$ through $C_4$. A feedback circuit, including the circuit elements within the dashed box identified as O is provided from the output of the last cascade stage $B_4$ to the input of the first cascade stage $B_1$ and the feedback circuit O includes an active filter N having a high frequency roll off characteristic and characteristic gain of at least unity. The N portion of the feedback circuit O is a network of resistors and capacitors, the values of which may be selected to provide the desired frequency characteristic of feedback circuit O. An active stage comprising an operational amplifier M, provided for in the aforementioned feedback loop feedback circuit O, should have a gain of at least unity and for the present embodiment has a positive gain of unity. It is to be understood that a negative gain of at least minus one may be chosen, in which event it will be necessary to make an appropriate change in the manner of supplying feedback to the input of the cascade network in order to assure injection of the feedback in proper phase relationship with the input signal.

The details of amplifiers A, $B_1$ through $B_4$ and coupling networks $C_1$ through $C_4$ are shown in detail and described in U.S. Pat. No. 3,562,744 which issued Feb. 9, 1971 to Donald L. Howlett, inventor of the present invention and assigned to Texaco Inc., assignee of the present invention. The output of each amplifier is applied to each buffer amplifier of amplifiers $D_1$ through $D_5$. Each buffer amplifier of amplifiers $D_1$ through $D_5$ functions as an isolation stage separating the respective outputs of amplifiers A through $B_4$ from the signal input of a corresponding switching network schematically shown as blocks $E_1$ through $E_5$.

A multiplexer control unit 1 provides control signals $V_1$, $V_2$ and $V_n$ in time relationship to each other. Control signal $V_1$ is applied to switches $E_1$ through $E_5$ in Channel 1 while control signal $V_2$ is applied to switches $E_1$ through $E_5$ in Channel 2 and control signal $V_n$ is applied to switch $E_1$ through $E_5$ in Channel $n$. Voltage $V_1$ reaches switches $E_1$ through $E_5$ in Channel 1 conductive to pass the buffer amplifiers $D_1$ through $D_5$ to unity gain buffer amplifiers $F_1$ through $F_5$. Each buffer amplifier of buffer amplifiers $F_1 - F_4$ has its outputs applied to a corresponding level comparator and to a corresponding switch of level comparators $LC_1$ through $LC_4$ and switches G1 through G4. The output from amplifier F5 is applied to switch G5. The outputs from level comparators LC2 through LC5 are applied to inverters $H_1$ through $H_4$, respectively. The output from level comparator $LC_1$ is applied to a storage register 15 while the outputs from level comparator $LC_2$ through $LC_4$ are applied to AND gates 7, 8 and 9, respectively. The output from inverters $H_1$ through $H_4$ are applied to AND gates 7, 8 and 9 and to storage register 15, respectively.

Comparators $LC_1$ through $LC_4$, AND gates 7, 8 and 9; and inverters $H_1$ through $H_4$ determine which of the outputs from amplifiers $F_1$ through $F_5$ is the greatest voltage which does not exceed the full scale level of an analog-to-digital converter and digital control logic 10 hereinafter referred to as converter 10.

Flip-flop storage register 15 provide sampling pulses S1 through S5 to control switches $G_1$ through $G_5$ to pass a sample of the greatest value signal from amplifiers F1 through F5 which does not exceed full scale of converter 10. It should be noted that only one of these switches will be activated at any one time by storage register 15.

In a typical five gain range per channel embodiment, the system channel analog sample rate is at 1-millisecond intervals for a 32-channel system or at 32-kilocycle sampling rate.

Assuming for example purposes only that the output from buffer amplifier $F_3$ provides the maximum signal which does not exceed the full scale limits of converter 10, storage register 15 will provide a sampling pulse S1 rendering switch $G_3$ conductive to pass the signal to amplifier 11 for the duration of sampling pulse S1 which in turn provides it to converter 10. Switches $G_2$ through $G_5$ are also connected to common output amplifier 11 and controlled in a similar manner.

At a time slightly before converter 10 sampling time an enter pulse is provided by converter 10 to enter the outputs provided by level comparator LC1, inverter $H_4$ and AND gates 7, 8 and 9 into storage register 15. The control signals from storage register 15 also drives an encoder 16 which provides a three bit binary number to converter 10 corresponding to the gain level to the recorded, along with the value of analog signal provided by amplifier 11. Encoder 16 also receives signals from amplifiers A in each channel which indicate the gain which each of those amplifiers is set at. Encoder 16 provides the three bit binary number as the sum of the log of the gain of A and the log of the gain selected by storage register 15 for a particular channel.

Converter 10 converts the analog signal provided by amplifier 11 to a digital signal and provides the digital signal along with the three bit binary signal to digital tape recorder 20 where they are recorded on tape. Converter 10 also provides an advance pulse AP and a reset pulse to multiplexor control unit 1. The advance pulses AP cause multiplexor control unit 1 to provide signals $V_1$ through $V_n$ in sequence.

The signal from amplifier 11 may change at too fast a rate for converter 10 to accurately sample. This problem is solved by modification of the level comparators to make them responsive to the rate of the changing signal from amplifier 11 as well as the absolute value of the signal from amplifier — such as amplifier F1, which is done with the type of level comparator shown in FIG. 2.

Figure 2:
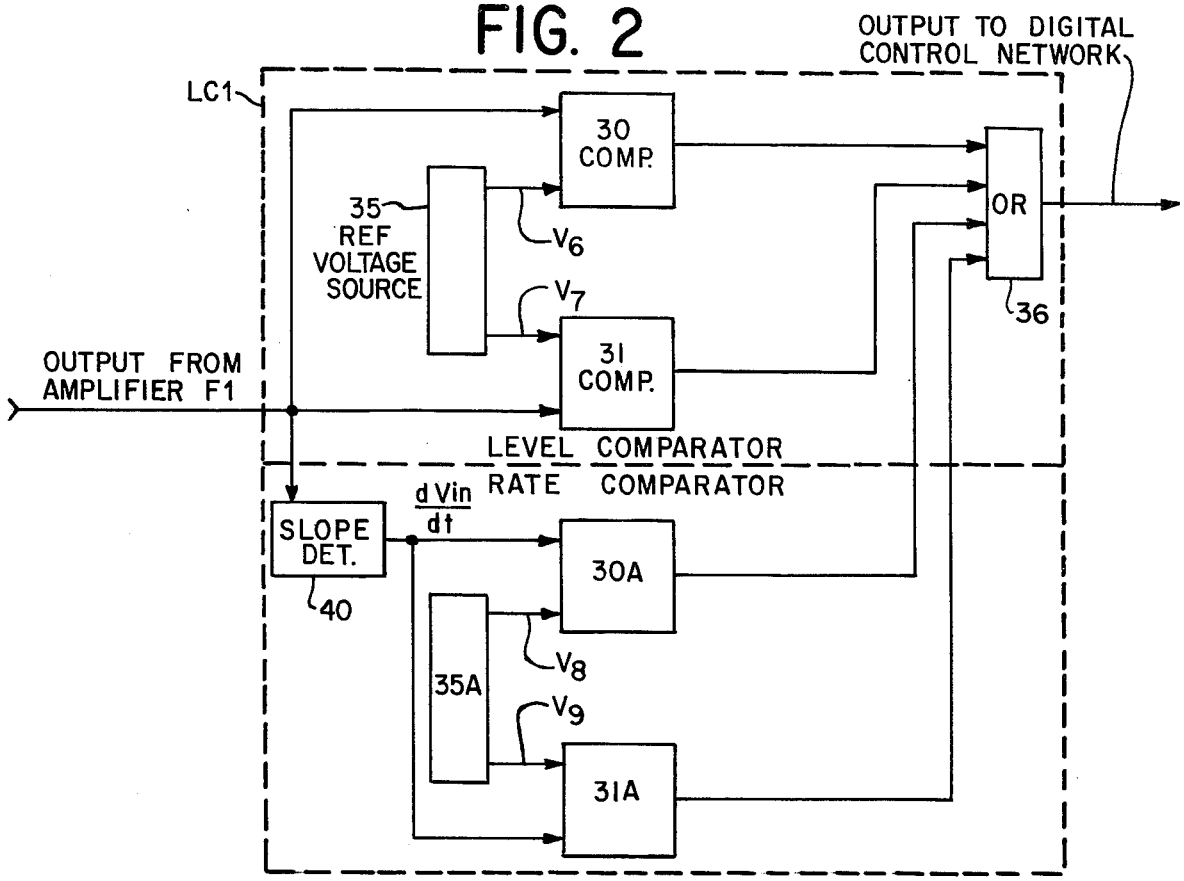
FIG. 2 is a simplified block diagram of a level comparator and a rate comparator which may be used with the system shown in FIG. 1 to provide another embodiment of the present invention.

The added portion, labeled slope comparator in FIG. 2, comprises a slope detector 40 receiving the signal from amplifier F1, comparators 30A, 31A and source 35A providing reference voltages $V_8$, $V_9$. Voltages $V_8$, $V_9$ define limits for the rate of change of the signal from amplifier F1. The outputs from comparators 30A, 31A are applied to OR gate 36. Thus, with the arrangement shown in FIG. 2, level comparator LC1 provides a low level output when the signal from amplifier F1 has an amplitude within the range defined by voltages $V_6$, $V_7$.

The level comparator LC1 shown in FIG. 2 includes reference comparators 30 and 31 receiving the signal from amplifier F1, reference voltage source 35 providing reference voltages $V_6$, $V_7$ and OR gate 36 would be used in level comparator for a system hereinbefore described. Voltages $V_6$, $V_7$ define a voltage range corresponding to the full scale range for converter 10.

When the signal from amplifier F1 is within the limits defined by voltages $V_6$, $V_7$, OR gate 36 provides a low level output. Should the signal from amplifier F1 exceed one of the limits defined by voltages $V_6$, $V_7$, one of the comparators 30 or 31 provides a high level signal causing OR gate 36 to provide a high level output, and its rate of change is within the limits defined by voltages $V_8$, $V_9$. Level comparator LC1 provides a high level output when the amplitude of the signal from amplifier F1 is not within the range defined by voltages $V_6$, $V_7$ or the rate of change of the signal from amplifier F1 exceeds one of the limits defined by voltages $V_8$, $V_9$.

Level comparators LC2, LC3 and LC4 would be of a similar type as level comparator LC1.

Figure 3:
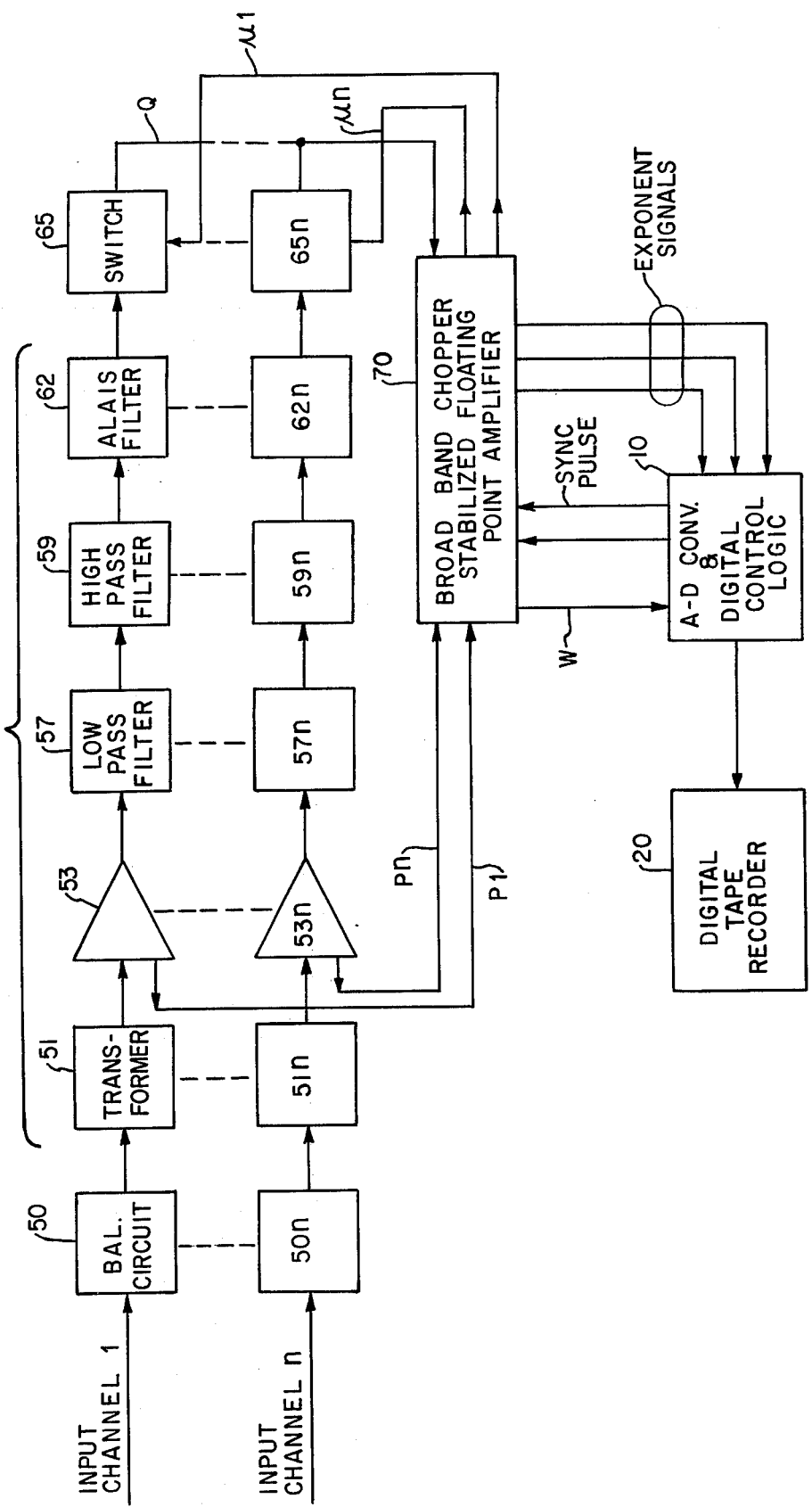
FIG. 3 is a simplified block diagram of a seismic recording system constructed in accordance with yet another embodiment of the present invention.

Referring now to FIG. 3, there is again shown a plurality of channels 1 through $n$, with each channel including a high line balancing circuit 50 receiving an input signal from a corresponding geophone, an input transformer 51, preamplifier 53, a low pass filter 57, a high pass filter 59 and alais filter 62, a switch 56 are connected in series. Pre-amps 53 through 53$n$ also provide signals $P_1$ through $P_n$ related to their gain to broad band chopper stabilized floating point amplifier 70, hereinafter referred to as floating point amplifier 70. Floating point amplifier 70 which will be discussed in detail hereinafter also receives the signal passed by switches 65 through 65$n$, as the Q signal. The gain of pre-amplifier 53 is normally adjusted manually to give an overall predetermined gain to each channel shown in FIG. 3 as determined by the operation of the system to be discussed in detail hereafter. However, in a preferred embodiment the gain of elements 50 through 62 should be $B^k$, so that K could be added to (or subtracted from) the exponent determined by the following states of the channel. One embodiment of the system uses a value of K equal to unity (K=1.000 and B=8). Switches 65 through 65$n$ are controlled in multiplexing fashion by control signals U through U$n$ provided by floating point amplifier 70. Floating point amplifier 70 provides gain coded digital signals corresponding to the exponent to converter 10 which also receives a signal W, corresponding to the amplified seismic signal, from amplifier 70. Converter 10 provides digital signals corresponding to the exponent and W signal to tape recorder 20 for recording.

Figure 5:
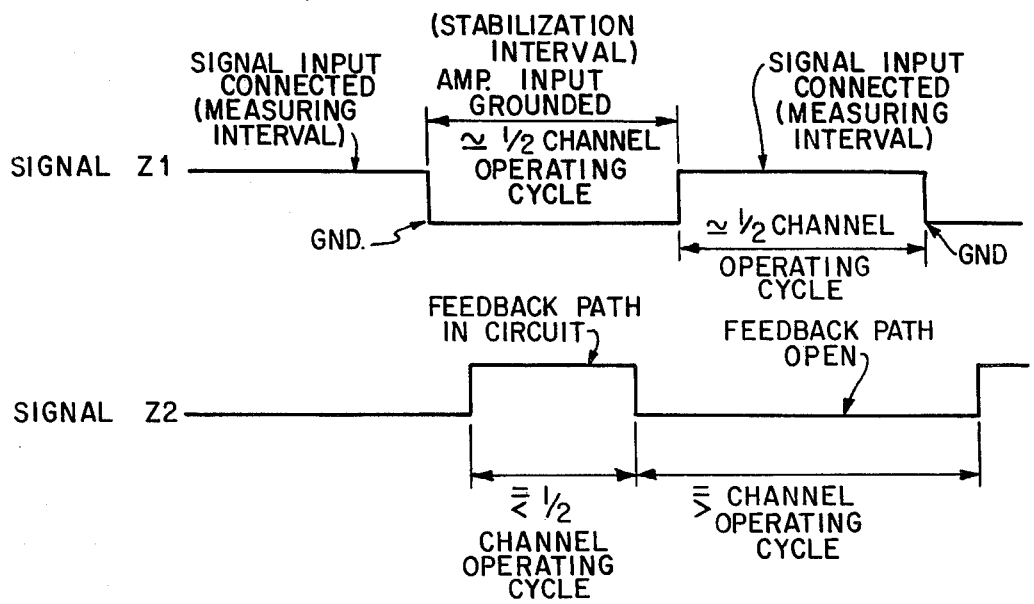
FIG. 5 is a timing diagram indicating the relationship of control signals from the chopper switch control logic element shown in FIG. 4.
Figure 4:
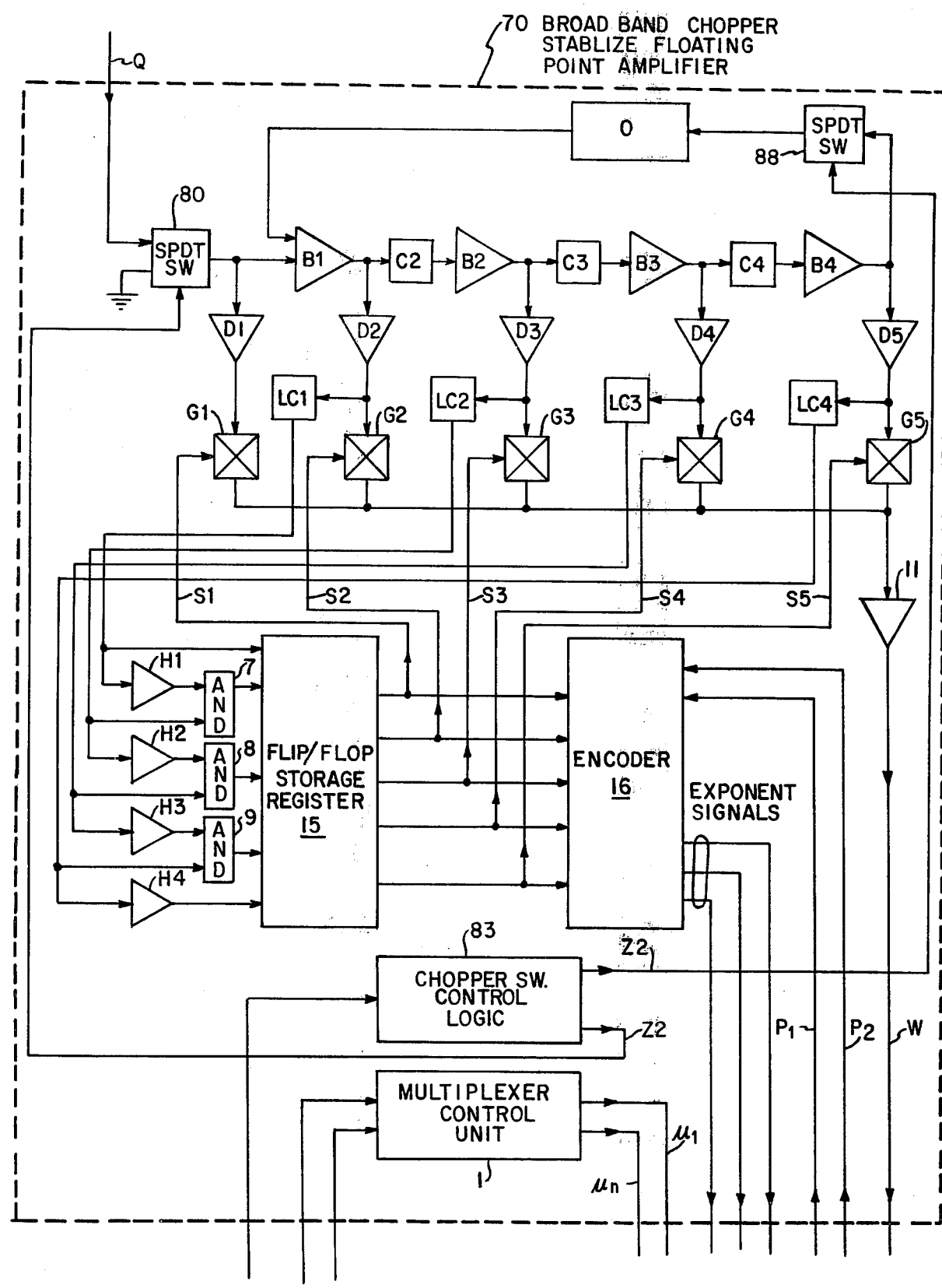
FIG. 4 is a detailed block diagram of the chopper stabilized floating point amplifier shown in FIG. 3.

Referring now to FIG. 4, floating point amplifier 70 includes a single pole double throw electronic switch 80 having one input receiving the Q signal from switches 65 through 65$n$ and another input connected to ground and controlled by a signal Z1 (shown in FIG. 5) from chopper switch control logic 83 to alternately pass the Q signal to amplifier $B_1$ and to ground the input to amplifiers $B_1$ through $B_4$, blocks $C_2$ through $C_4$, drivers D1 through D4, level comparators LC1 through LC4, switches G1 through G5, inverters $H_1$ through $H_4$, AND gates 7, 8 and 9, storage register 15, encoder 16 and amplifier 11 cooperate in the same manner as hereinbefore described to provide the signal W.

The output of amplifier B4 is also provided to a single pole single throw switch 88 which connects amplifier B4 to feedback network 0. Switch 88 is controlled by a signal $Z_2$ (shown in FIG. 5) from chopper switch control logic 83. The sequence is such that the switch 80 passes the Q signal from switches 6 through 65n to series connected to amplifiers B1 through B4 where it is amplified as hereinbefore described, while switch 88 blocks the output from amplifier B4 so as to not provide feedback to amplifier B1. Switch 80 is then controlled by signal $Z_1$ from the control logic 83 to effectively ground the output of amplifier B1 so that the output from amplifier B4 is substantially at zero level. Then later in time, switch 88 is controlled by signal $Z_2$ from control logic 83 to pass the output of amplifier B4 to element 0, which provides a feedback signal to amplifier B1, for a predetermined time period. After the predetermined time period has ended, signal $Z_1$ controls switch 80 to pass the Q signal to amplifier B1. In summary with each multiplexing cycle, the Q signal from a switch of switches 65 through 65n is applied to amplifier B1 for approximately half of the cycle. During the half cycle, the Q signal is not applied to amplifier B1, an error feedback voltage is applied to the 0 network by amplifier B4.

The system and method of the present invention as hereinbefore described provides a seismic recording system in which the amplified signals corresponding to an analog input signal are simultaneously compared with reference signals to provide a rapid selection and sampling of an amplified signal to provide as an analog output and converting means for converting the analog output to digital signals corresponding to a gain relationship between the analog output R and the analog input signal and to the analog output. The system and the method of the present invention also provides for multiplexing of several channels. The system includes a network for providing rate of signal change comparison as well as amplitude comparison.

What is claimed is:

1. A system which comprises means for receiving an analog input signal, amplifying channel means connected to the receiving means for amplifying a received analog input signal to provide amplified signals of different amplitudes, level comparing means for comparing each amplified signal, except for the least amplitude amplified signal, with reference signals corresponding to a predetermined amplitude range for an analog output and providing a plurality of outputs, each output corresponding to a comparison of a different amplified signal with the reference signals, a plurality of switches, each switch receiving a different amplified signal and responsive to a different sampling pulse to pass the amplified signal when the sampling pulse is present and to block the amplified signal during the absence of a sampling pulse; means connected to the amplifying channel means, to the comparing means and to the switches for providing the sampling pulses of a predetermined duration and at a predetermined rate to the switches in accordance with the outputs from the comparing means and the least amplitude amplified signal to cause the switches to pass samples of the amplified signal as the analog output; and converter means connected to the switches and to the amplifying channel for providing digital signals, some of which correspond to the gain relationship between the analog input signal and the analog output while the others correspond to the polarity and magnitude of the analog output.

2. A system as described in claim 1 further comprising a plurality of receiving means for receiving different analog input signals; a plurality of amplifying channel means, each amplifying channel means being connected to a corresponding receiving means for amplifying a received analog input signal from the receiving means to provide amplified signals of different amplitudes; a plurality of switching means, each switching means being connected to the plurality of switches to the level comparing means and to a corresponding amplifying channel means and receiving a multiplexing signal so as to pass the amplified signals to the plurality of switches and to the level comparing means when the multiplexing signal is of one amplitude to block the amplified signals when the multiplexing signal is of another amplitude; and multiplexing means for repetitiously providing the multiplexing signals to the switching means in a manner so that during each multiplexing cycle the amplified signals of each amplifying channel means are applied to the plurality of switches during a different multiplexing cycle segment.

3. A system as described in claim 2 in which the level comparing means includes a plurality of level comparing network means; each level network comparing means includes two comparators receiving a different passed amplified signal from the switching means and comparing the passed amplified signal with the reference signals to provide outputs corresponding to the comparison, and means connected to the comparators for providing a comparison signal in accordance with the outputs from the comparators.

4. A system as described in claim 3 in which the reference signal means also provide rate reference signals corresponding to limits for the rate of change for the analog output; further comprising rate comparing means connected to the plurality of switching means and receiving the passed amplified signals from the switching means, except the least amplitude signal of the passed amplified signals, and including a plurality of rate comparing network means, each rate comparing network means receiving a different passed amplified signal for providing a signal corresponding to the rate of change with respect to time of the passed amplified signal, two comparators connected to the rate signal means for comparing the rate signal with the rate reference signals to provide outputs corresponding to the comparison, and wherein each comparison signal means is connected to all the comparators receiving the same passed amplified signal or its corresponding rate signal and provides the comparison signal in accordance with the outputs from those comparators.

5. A system as described in claim 3 in which each amplifying channel means includes a series of cascade connected amplifier stages having a first amplifier stage and a last amplifier stage and which said first amplifier stage provides a signal corresponding to its gain as a gain signal and each amplifier stage, except for the first amplifier stage, being connected to its next preceding stage and, except for the last amplifier stage, its next subsequent stage and amplifier stage provides an amplified signal to the switching means, and feedback means connected to the output of the last amplifier stage for feeding back the signal to the second amplifier stage, and the portion of the digital signal associated with the analog input signal.

6. A system as described in claim 5 further comprising a plurality of groups of geophones, each group of geophones being connected to a different receiving means and providing an analog signal to the receiving means, corresponding to sensed vibrations in the earth, as an analog input signal.

7. A system as described in claim 1 further comprising a group of geophones connected to the receiving means which provide an analog signal to the receiving means, corresponding to sensed vibrations in the earth, as the analog input signal.

8. A system which comprises a plurality of receiving means for receiving analog input signals, each receiving means receives a different analog input signal and providing a received signal; a plurality of amplifying stages, each amplifier stage being connected to a different receiving means and providing an amplified signal, corresponding to the receiving signal from the receiving means, and a gain signal; switching means connected to the amplifier stages and receiving multiplexing signals for passing one amplified signal at time in a sequential manner in accordance with the multiplexing signals so that during each multiplexing cycle all amplified signals have been passed by the switching means; means connected to the switching means for providing the multiplexing signals; amplifying channel means connected to the switching means for providing amplified signals of different amplitudes corresponding to the passed signal from the switching means; reference signal means for providing signals corresponding to a predetermined amplitude range for an analog output; comparing means connected to the amplifying channel means and to the reference signal means for comparing the amplified signals, except the least amplitude amplified signal, from the amplifying channel means with the reference signals and providing comparison signals corresponding to the comparisons; a plurality of switches connected to the amplifying channel means, each switch receiving a different amplified signal from the amplifying channel means and responsive to a sampling pulse to pass the amplified signal from the amplifying channel means as the analog output; means connected to the plurality of switches and to the comparing means for providing sampling pulses to the plurality of switches at a predetermined rate and in accordance with the comparison signals so that only one amplified signal from amplifying channel means is sampled by the plurality of switches during the occurrence of a sampling pulse; and converter means connected to the plurality of switches and to the amplifier stages for providing digital signals some of which correspond to the analog output while the remaining digital signals correspond to the gain signal from the amplifier stage whose amplified signal is being passed by the switching means.

9. A system as described in claim 8 in which each amplifier stage includes a balancing circuit connected to a corresponding receiving means, a transformer connected to the balancing circuit for providing a signal corresponding to the output from the balancing circuit; an amplifier for amplifying the output from the transformer and for providing a signal corresponding to the gain of the amplifier, a low pass filter, a high pass filter connected to the low pass filter, and an alais filter connected to the high pass filter for providing the filtered amplified signal to the switching means.

10. A system as described in claim 9 in which the amplifier networks connected in cascade arrangement having a first amplifier network having two inputs and a last amplifying network, second switching means receiving the passed amplified signal from the first switching means and a switching signal being connected to ground, and to one input of the first amplifier network for passing the passed amplified signal from the first switching means to the one input of the first amplifier network or for grounding the one input to the first amplifier network in accordance with the switching signal, said second switching means also providing the passed amplified signal from the first switching means as the least amplitude amplified signal, third switching means connected to the last amplifier network and receiving a second switching signal for passing the amplified signal from the last amplifier network when the second switching signal is of one amplitude, feedback means connecting the third switching means to the other input of the first amplifier network for feeding back the signal passed by the third switching means to the other input of the first amplifier network, and means connected to the second and third switching means for providing the switching signals in a manner so as to alternately pass the passed amplified signal from the first switching means to the first amplifier network and for grounding the one input to the first amplifier network and for feeding back the amplified signal from the last amplifier network to the other input of the first amplifier network while the one input of the first amplifier network is being grounded.

11. A system as described in claim 10 further comprising a plurality of groups of geophones, each group of geophones being connected to a different receiving means and providing an analog signal to the receiving means, corresponding to sensed vibrations in the earth, as an analog signal.

12. A method which comprises the steps of: receiving an analog input signal, amplifying a received analog input signal to provide amplified signals of different amplitudes, level comparing each amplified signal, except for the least amplitude amplified signal, with reference signals corresponding to a predetermined amplitude range for an analog output, providing a plurality of comparison outputs, each comparison output corresponding to a level comparison of a different amplified signal with the reference signals, selecting and providing a sample of an amplified signal in accordance with a sampling pulse, providing sampling pulses of a predetermined duration and at a predetermined rate in accordance with the comparison outputs and the least amplitude amplified signal to cause the selection and providing of samples of the amplified signal as the analog output, and providing digital signals, some of which correspond to the gain relationship between the analog input signal and the analog output while the others correspond to the polarity and magnitude of the analog output.

13. A method as described in claim 12 further comprising receiving a plurality of different analog input signals; amplifying each received analog input signal to provide amplified signals of different amplitudes, providing the amplified signals corresponding to a different received analog input signal in response to a multiplexing signal, repetitiously providing the multiplexing signals in a manner so that during each multiplexing cycle the amplified signals associated with analog input signal are provided for comparison and selection during a different multiplexing cycle segment; and wherein the comparison step involves only those amplified signals provided in response to a multiplexing signal.

14. A system as described in claim 13 in which the reference signal step also includes providing rate reference signals corresponding to limits for the rate of change for the analog output; and the comparing step also includes comparing each amplified signal with the rate reference signals, except the least amplitude amplified signal, and providing each comparison output in accordance with the level comparison and the rate comparison of a corresponding amplified signal with the reference signals.

* * * * *